March 1, 1955
M. T. VOIGT
2,703,369
ELECTRIC POWER TRANSMISSION FOR
SEWING MACHINES AND THE LIKE
Filed June 8, 1950
3 Sheets-Sheet 1
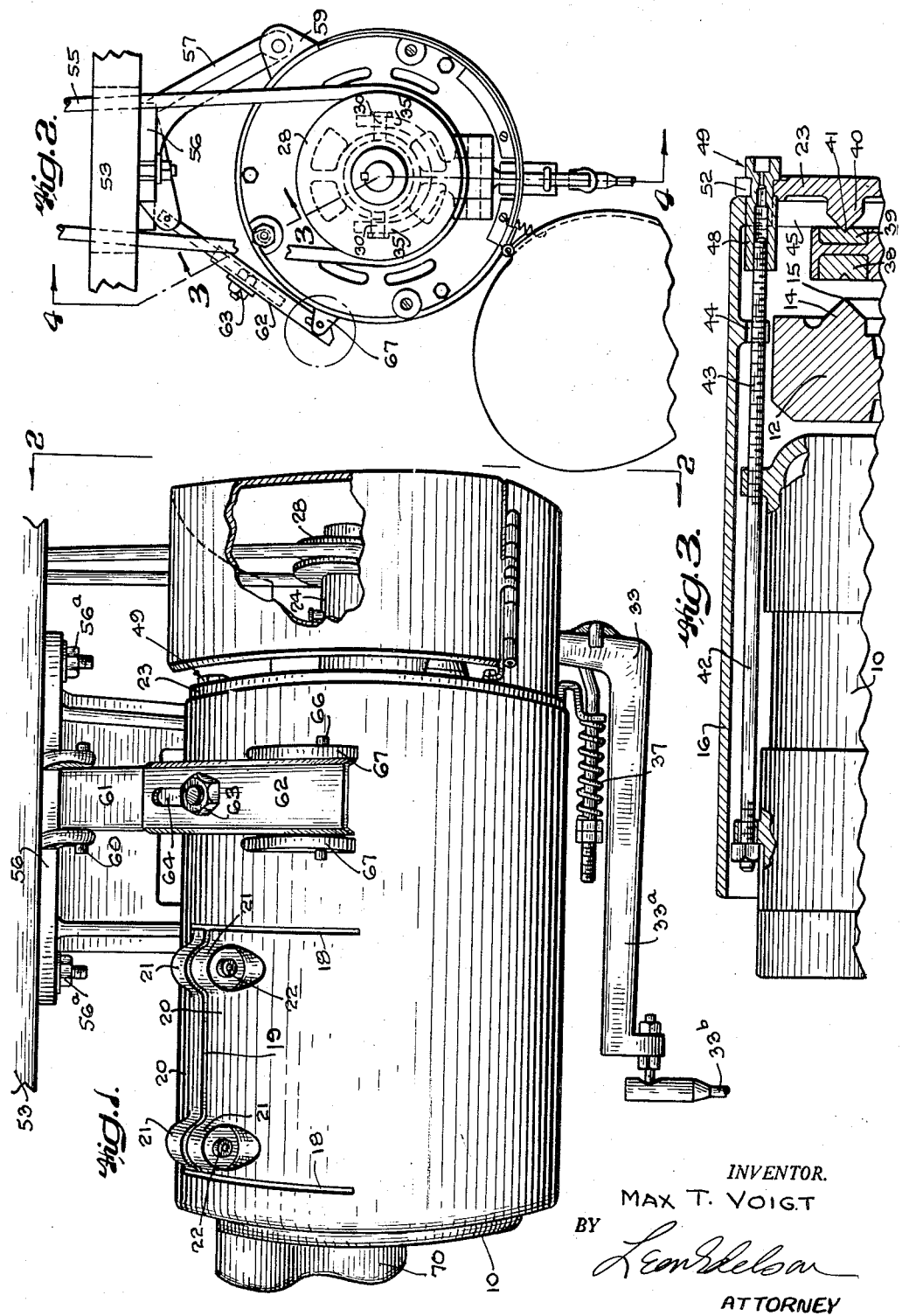
INVENTOR.
MAX T. VOIGT
BY
Leon Skelson
ATTORNEY

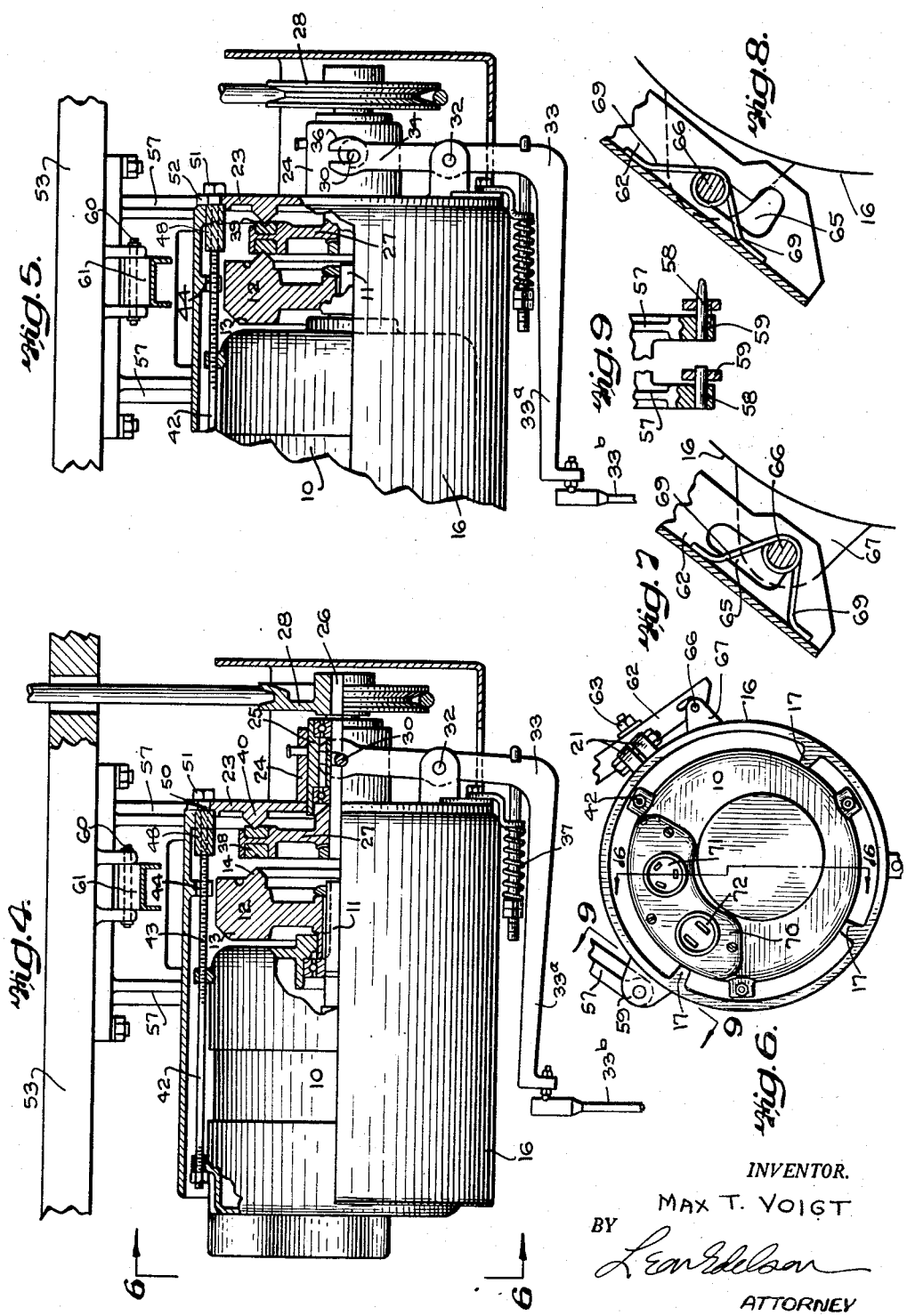

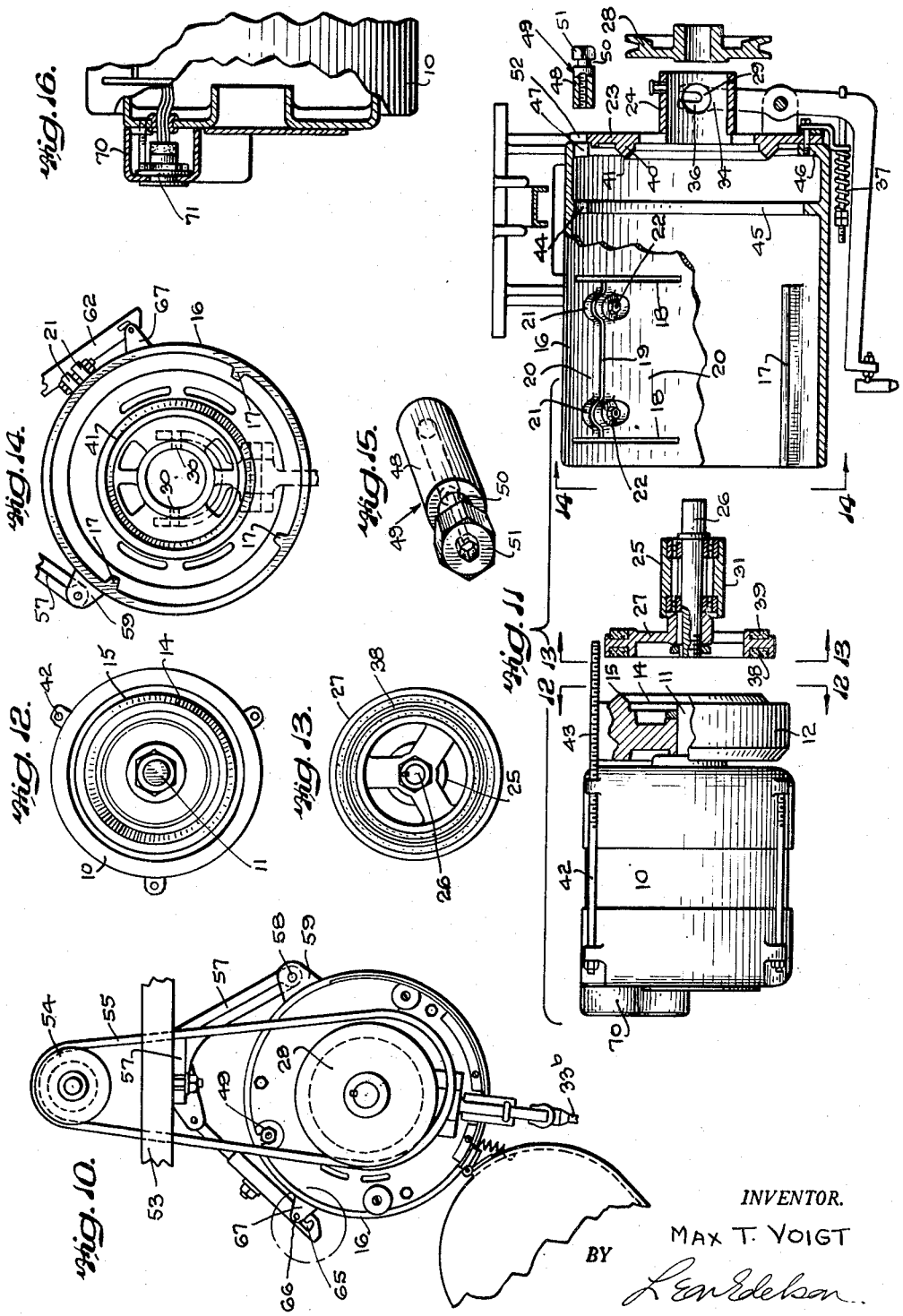

United States Patent Office 2,703,369
Patented Mar. 1, 1955

2,703,369

ELECTRIC POWER TRANSMISSION FOR SEWING MACHINES AND THE LIKE

Max T. Voigt, Wyomissing, Pa., assignor to American Safety Table Co., Inc., Mohnton, Pa., a corporation of Pennsylvania Application June 8, 1950, Serial No. 166,791

9 Claims. (Cl. 310—76)

This invention relates generally to apparatus for the transmission of power from a continuously operating motor mechanism to a machine adapted for intermittent operation, and more particularly to certain features of and improvements in the apparatus which is disclosed in my prior Patent No. 2,536,860, granted January 2, 1951, the present application being a continuation in part of the application for said patent, the latter having been file May 13, 1947.

The apparatus of the present invention is characterized generally by the provision of a compact power transmission organization which includes as its essential components an electric motor, a support therefor in the form of an enclosing housing within which the motor is axially adjustable, and means also carried by the housing and shiftable axially with respect thereto to alternatively clutch the motor to the intermittently driven utility machine and to instantly arrest or brake the operation of the driven utility when the motor is declutched therefrom.

Among the principal objects of the present invention is to provide a simple and rugged motor drive organization of the type above described in which the electric motor may operate continuously, the organization being provided with a combined clutch and brake element for the intermittent transmission of power to a unit, such as a sewing machine or the like, and for the effective braking of the unit when it is disconnected from the motor.

One of the features of the present invention aims to provide in the organization above described easily accessible means for effectively adjusting the position of the motor within the housing to adjustable vary as desired the axial spacing between the revoluble motor unit and the combined clutch and braking unit, while another feature of the invention resides in certain improved means for securely clamping the motor in its adjusted position within the housing to thereby insure the provision of a rigidly fixed assembly of the motor and its housing.

Still another object of the invention is to provide a housing for the motor which serves also as a support for the clutch and brake mechanism operatively associated with the motor, the housing being of such design and character as to more or less fully enclose the motor to maintain it free of dirt and lint and still provide for adequate ventilation of the motor and being further designed to permit independent removal therefrom of the motor and the combined clutch and brake mechanism for such periodic maintenance and servicing thereof as may be required.

A further object of the present invention is to provide an improved bracket support for the motor and housing which permits removal and replacement with great facility of the drive belt extending between the driving and driven mechanisms without disturbing the preadjusted spaced relation between the belt pulleys of the mechanisms, thereby insuring maintenance of correct belt tension for most efficient operation of the driven unit.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings, which illustrate an apparatus constructed in accordance with and embodying the general principles of the present invention:

Figure 1 is a side elevational view showing the apparatus as operatively mounted on the underside of a table adapted to support a sewing machine or the like;

Figure 2 is an end elevational view of the apparatus taken on the line 2—2 of Figure 1, but showing the safety cover or shield for the belt pulley in its lowered position;

Figure 3 is a longitudinal sectional view of the motor and casing assembly as taken on line 3—3 of Figure 2;

Figure 4 is a side elevational view, partly in section, of the apparatus showing the clutch in its disengaged position;

Figure 5 is a view similar to Figure 4 but showing the motor axially adjusted to a position for instant starts and stops;

Figure 6 is an end view of the apparatus taken on line 6—6 of Figure 4;

Figure 7 is a view, on a somewhat enlarged scale, of the releasable detent arrangement which is operative to facilitate ready removal of the drive belt;

Figure 8 is a view similar to Figure 7 but showing the detent in its belt-releasing position;

Figure 9 is a detail of the pivotal support for the apparatus as taken on line 9—9 of Figure 6;

Figure 10 is an end view of the apparatus with the drive belt in its tensionally released condition;

Figure 11 is an exploded view of the apparatus showing the several principal parts thereof;

Figure 12 is an end view of the motor as taken along the line 12—12 of Figure 11;

Figure 13 is an end view of the shiftable clutch and brake unit as taken along line 13—13 of Figure 11;

Figure 14 is an end view of the motor housing as taken along line 14—14 of Figure 11;

Figure 15 is a perspective view of the nut for positionally adjusting the motor axially within its supporting housing; and Figure 16 is a sectional view as taken on lines 16—16 of Figure 6.

Referring now to the drawings and more particularly to Figures 1, 4, 5 and 11 thereof, it will be observed that the apparatus of the present invention substantially includes an electric motor 10, the shaft 11 of which is extended to receive thereon a flywheel 12, this flywheel being suitably keyed or locked to the motor shaft for rotation therewith. Formed upon the face of the flywheel immediately adjacent to the motor 10 are a plurality of circumferentially spaced radial vanes 13 which force cooling air over the peripheral surface of the motor during operation thereof. Formed upon the opposite or outer face of the flywheel is an annular rib 14 of generally triangular shape and transverse cross section to provide it will a relatively sharp outer edge 15.

The motor 10 and its associated flywheel 12 are mounted as an assembly within a supporting housing 16 of generally cylindrical shape, this housing 16 being of a length somewhat greater than the over-all length of the motor and flywheel assembly. Formed interiorly of the housing as integral elements thereof are a plurality of circumferentially spaced ribs 17 each extending longitudinally of the housing, these ribs serving to space the motor concentrically within the housing.

As most clearly appears in Figures 1 and 11, the motor housing 16 is provided with a pair of longitudinally spaced circumferentially extending parallel slits 18—18 and with a longitudinally extending slit 19 extending between and interconnecting the circumferentially extending slits 18—18. These slits 18—18 and 19 form a pair of winged portions 20—20 which are adapted to be drawn together to clamp the motor securely within the housing 16. To this end each of the winged portions is provided at its free edge with a pair of longitudinally spaced bosses 21—21 which are respectively apertured so that each registering pair of bosses may receive a bolt 22 for drawing the portions 20—20 into clamping engagement about the motor housed within the housing 16. It will be understood that the motor 10 and its associated flywheel 12 are axially shiftable within the housing 16 and that by tightening the bolts 22—22, the motor and its flywheel are fixed as a unit within the housing. It will also be understood that when the motor is thus secured clamped within the housing in its axially adjusted position, the flywheel is centered within the housing and is free to rotate therewithin.

Suitably secured to the rear end of the housing 16 is a centrally apertured end plate 23 from which rearwardly projects a cylindrical journal box 24. Slidably fitted within this journal box 24 is a ball-bearing assembly 25 within which is rotatably journalled a shaft 26 to the oppositely projected ends of which are respectively secured a clutch disc 27 and a belt pulley 28. The journal box or housing for the ball bearing assembly is provided at diametrically opposite sides thereof with openings 29—29 through which respectively project a pair of studs 30—30 suitably secured to opposite sides of the external sleeve 31 of said ball-bearing assembly 25. It will be understood, of course, that the clutch disc 27 and the belt pulley 28 are each nonrotatably secured to the shaft for rotation therewith and that the said clutch disc, belt pulley, shaft 26 and the ball-bearing assembly are axially shiftable as a unit within the relatively stationary journal box or housing 24 by the means presently to be described.

Pivotally secured to the end plate 23 of the motor housing 16, as at 32, is a clutch-actuating lever 33, this lever being provided at its upper end with a yoke portion 34 having laterally spaced arms 35—35 adapted to embrace therebetween the journal box 24, these arms 35—35 being each provided with a slotted terminal end 36 for engagement with a stud 30 projecting outwardly through the opening 29 in the side wall of the journal box. The lever 33 is under the influence of a compression spring 37 which normally holds the lever in its position as shown in Figure 1, in which position the clutch disc 27 is disengaged from the flywheel of the motor 10. The lower arm 33A of the pivoted lever is suitably connected, as by a link or rod 33B, to a foot treadle or the like (not shown) for actuation of the lever, it being noted that a downward pull upon the link 33B shifts the yoke portion 34 of the lever toward the motor and so causes the clutch 27 to engage the motor flywheel as shown in Figure 5.

As most clearly appears in Figures 4, 5 and 11, the clutch disc 27 is provided adjacent its perimetral edge with a pair of oppositely facing annular friction discs 38 and 39 of cork or other suitable resilient material, the disc 38 being adapted to engage the annular rib 14 of the motor flywheel 12 while the disc 39 is adapted to engage an annular rib 40 formed upon the innerface of the end plate 23 of the motor housing 16. The annular rib 40 is similar to the annular rib 14 in that it also is of generally triangular shape in transverse cross-section to provide it with a relatively sharp outer edge 41.

The cylindrical housing 16 for the motor 10 serves not only as a support for maintaining the motor and clutch mechanism in axial alinement, but also as a means for adjusting the motor axially toward or away from the clutch mechanism to insure accurate spacing between the rib 14 of the rotatable flywheel 12 and the rib 41 of the stationary end plate 23. To effect this adjustment it is merely necessary to loosen the clamping bolts 22—22 sufficiently to permit axial adjustment of the motor within the housing to present the motor flywheel in proper spaced relation to the end plate 23, whereupon the bolts 22—22 are tightened to securely maintain the motor and its associated clutch mechanism in their proper relation.

In order to conveniently and quickly effect axial adjustment of the motor within its housing 16, one of the stay bolts which are conventionally employed to secure together the end bells of the motor casing is replaced by a special bolt 42 of considerably greater length than that of the conventional bolt. This special bolt 42 extends between the end bells of the motor casing to secure the same together and is provided with a freely projecting threaded portion 43. Preferably, this freely projecting threaded portion of the bolt 42 extends through a guide notch 44 suitably formed in an annular rib 45 formed internally of the housing 16 in embracing relation with respect to the flywheel 12. The rear end of the motor housing 16 is provided with an inwardly presenting annular flange 46 against the rear face of which is disposed the marginal edge of the end plate 23. This end flange 46 of the housing 16 is notched as at 47 in registry with the guide notch 44 formed in the internal rib 45 of the housing, the notch 47 being adapted to receive the barrel portion 48 of a special nut which is revolubly mounted in the end plate 23 for threaded engagement with the threaded end of the elongated bolt 42. This special nut, designated generally by the reference numeral 49, is most clearly shown in Figure 15, wherein it will be observed that said nut 49 is intermediately provided with a constricted neck portion 50, with a tool engaging outer end portion 51 and with the inwardly projecting barrel portion 48 which is interiorly threaded to receive the end of the bolt 42. The constricted neck portion 50 of the nut 49 is rotatably received within a notch 52 suitably formed in the peripheral edge of the end plate 23 in substantial registry with the notch 47 formed in the end flange of the housing 16. The nut 49, being thus restrained against axial movement relatively to the end plate 23, upon rotation about its own axis in one direction or the other effects axial shifting of the bolt 42 with which it is threadedly engaged and so serves as an effective means for shifting the motor 10 and its associated flywheel 12 as a unit axially of the housing 16. The nut 49 thus provides what is in effect a vernier control for positional adjustment of the motor and flywheel unit relatively to the clutch and brake mechanism, it being apparent that by decreasing the spacing between the flywheel clutch element 14 and the shiftable clutch friction disc 38, the permissible throw of the clutch disc 27 is reduced with consequent increase in the clutching speed. Thus, by reducing the permissible throw of the clutch disc 27 between the flywheel clutch element 14 and the stationary braking element 40, instant and positive starting and stopping of the driven utility machine is practically obtained.

Where the conditions are such as not to require positive engagement of the clutch elements and of the braking elements so as to insure practically instant starting and stopping of the work utility, the motor and flywheel unit may be shifted axially away from the clutch disc 27 by means of the adjusting nut 49 and so lengthen the permissible throw of the clutch disc 27. By so lengthening the clutching stroke, both clutching and braking may be effected more gradually and with less positiveness. Figure 4 shows the motor and flywheel unit axially adjusted within the housing 16 for a relatively long clutch stroke, to provide for slower and less positive starting and stopping action of the work utility designed to be driven by the motor. Figure 5 is a view similar to Figure 4 but showing the motor and flywheel unit positionally adjusted to provide for a relatively short stroke of the clutch disc 27, the adjustment shown in Figure 5 being such as insures practically instant starting and stopping action of the driven work utility. It will be understood, of course, that in order to effect axial positional adjustment of the motor 10 within the housing 16 by means of the adjusting nut 49, the bolts 22—22 are first loosened to free the motor within the housing, these bolts being then retightened to secure the motor in its adjusted position within the housing.

The above described means for adjusting the position of the motor 10 within its housing 16 makes it possible to provide for relatively slow starting and stopping of the work utility when such operation is desired, as well as for exceedingly quick starting and stopping of the utility. In the latter case, the motor is positionally adjusted within the housing in such close relation to the clutch disc 27 that only a slight movement of the operating pedal 33 is required to clutch the motor flywheel to the disc 27 for quick starting of the work utility or to engage the disc 27 with the stationary braking member for quick stopping of the utility. Should the operator prefer slower starting and stopping of the operating machine, the clutch stroke is lengthened as above described by means of the adjusting nut 49.

The sewing machine or other instrumentality adapted to be driven by the power transmitting apparatus of the present invention is normally mounted upon a table 53, while the power transmitting apparatus is suspended therebelow, as appears most clearly in Figures 1, 4 and 5, the pulley 54 of the driven instrumentality being connected to the pulley 28 of the power transmitting apparatus by the belt 55. Particularly in the case of a sewing machine, it is necessary to provide and maintain this drive belt with the proper tension, and having once adjusted the belt to the proper tension, it becomes a matter of serious inconvenience if this tension be subsequently disturbed, as when it becomes necessary to replace the belt or remove it for purposes of maintenance or repair of the sewing machine or its driving mechanism.

Having in mind the foregoing, the present invention provides an improved mounting for the apparatus hereinbefore described which facilitates removal of the drive belt as required without disturbing the predeterminedly fixed relation between the drive pulley 28 and the driven pulley 54. As most clearly appears in Figures 1, 4 and 5, the motor housing 16 is pivotally secured to a bracket 56 which in turn is pivotally secured, as by the bolts 56A, to the undersurface of the table 53. This bracket 56 is preferably in the form of a relatively broad plate having a pair of laterally spaced arms 57—57 respectively fitted with pins 58—58 adapted for projection through suitably apertured lugs 59—59 formed on the motor housing 16. One of these pins is preferably longer than the other, as shown in Figure 9, to serve as a guide pin for facilitating quick detachable connection of the motor housing with its supporting bracket 56.

Pivotally secured to the bracket 56, as at 60, is a channel shaped member 61, the free end portion of which is telescopically received within a second channel shaped member 62. These channel shaped members 61—62 are secured together by a bolt 63 so that they conjointly constitute a supporting link extending between the pivot 60 and the motor housing, the members being relatively adjustable to vary the over-all length of the supporting link. To this end, one or the other of the members 61—62 is preferably provided with an elongated slot 64 through which the bolt 63 projects.

The outer free extremity of the link member 62 is provided in its opposite side walls with L-shaped openings 65—65 through which transversely extends a pin 66, the opposite ends of this pin being fitted in lugs 67—67 suitably provided on the motor housing 16. Thus, the link formed of the telescope members 61—62 serves conjointly with the bracket 56 to support the motor unit as shown most clearly in Figures 1, 2, 4 and 5, the weight of the unit normally maintaining the pin 66 at the outer ends of the slot 65—65 as shown in Figure 7. In this position of the motor unit, the drive belt 55 will be fully extended and under proper tension, the distance between centers of the pulleys 28 and 54 being fixed by adjustment of the link 60—62 to proper length. In order to remove the belt from the pulley 28, it is, of course, only necessary to raise the motor unit upwardly about the pivot pins 58—58 to locate the opposite transverse pin 66 at the inner end of the L-shaped opening 65—65 formed in the side walls of the link member 62, thereby freeing the belt for its easy removal from the pulley 28, all as best shown in Figure 10.

During operation of the apparatus it is, of course, necessary that the motor unit be fixedly secured in position against such movement as would disturb the proper tension of the belt 55 and for that purpose the transverse pin 66 extending between the motor housing lugs 67—67 is embraced by a helical spring 68, the opposite ends of which are extended as at 69—69 to bear against the link member 62. This coil spring 68 normally exerts a bias upon the link member 62 tending to move the latter away from the peripheral surface of the motor housing 16, thereby normally tending to maintain the pin 66 in the laterally extending portion of the slot 65. (See Figure 7.) In the condition of the parts as shown in Figure 7, the links 61—62 prevents any pivotal movement of the motor housing 16 about its supporting pivot pins 58—58.

To release the parts from their interlocked engagement and so permit the motor unit to be swung about its pivot pins 58—58 into the position shown in Figure 10, it is only necessary to press the link member 62 inwardly toward the motor unit to aline the longitudinally extending portions of the slot 65—65 with the detent pin 66, whereupon the motor unit is free to be swung about its pivot pins 58—58 into its position shown in Figure 10, the detent pin 66 being then located at the inner ends of the slot 65—65 (see Figure 8). The motor unit is then raised sufficiently to provide the belt 55 with sufficient slack to permit its removal from the pulleys 28 and/or 54. It will be apparent that by means of the locking detent just described, slackening of the belt may be affected expeditiously for purposes of removing the same, all without disturbing the effective length of the link member 61—62. Thus, having once adjusted the length of this link member for correct tension of the belt 55, the latter may be repeatedly removed and replaced with assurance that the replaced belt will at all times be of the proper tension.

Suitably secured to the outer end of the motor 10 is a receptacle 70 which is fitted with a pair of sockets 71 and 72 for respectively quick detachably receiving a pair of electric plug members (not shown). The socket members 71 and 72 are each electrically connected to the motor winding, the socket 71 being so connected as to supply operating current to the motor, while the socket 72 is so connected to the motor winding as to provide a low voltage supply of current for operating a lighting fixture (not shown) conveniently mounted upon or adjacent to the work utility. A suitably wired power plug, when connected into the socket 71, supplies operating current at requisite voltage to the motor, while a suitably wired lighting plug connected into the socket 71 supplies current to the lighting fixture associated with the work utility, such as a sewing machine. The motor-mounted receptacle 70 with its built-in sockets 71—72 thus makes possible the convenient use of wired plug-in connectors for operating the motor from a suitable source of electrical supply and for supplying operating current through the motor to a lighting fixture or other auxiliary associated with the driven operating machine.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. An assembly comprising a housing open at one end, an electric motor disposed within said housing, a combined clutch and brake unit disposed within said housing, said motor having a rotating shaft and a clutch element keyed to said shaft, the other end of said housing having an end plate carrying a fixed brake element, said combined unit being movable between clutch engaging and brake engaging position, and means for adjusting said motor axially within said housing to vary the extent of movement of said combined unit, said means comprising a pair of coaxially related elements one of which is fixed relative to, and axially extended beyond, said motor for threaded engagement with the other, the latter being revolubly carried by said end plate whereby upon rotation thereof axial movement of said motor relative to said housing is effected through said one fixed element.

2. In an assembly as defined in claim 1 wherein the thread element carried by the end plate is provided with a constricted portion adapted to be revolubly received in a suitable opening in the end plate.

3. An assembly comprising a motor having a clutch element, a housing for said motor having at one end thereof a stationary braking element, an axially movable combined clutch and brake unit disposed within said housing, said unit having clutch and brake elements respectively adapted for engagement with the clutch and brake elements of said motor and housing, means for adjustably moving the motor axially within the housing to vary the permissible axial stroke of said unit between said clutch element of the motor and the brake element on said housing, said means comprising a pair of elements one of which is carried by said motor in fixed relation thereto, being axially extended therebeyond for engagement with the other, the latter being carried by said end plate and being revoluble for axial movement of said motor relative to said housing effected through said one fixed element.

4. In an electric power transmission apparatus, an electric motor having a rotating shaft and a flywheel keyed to said shaft, a clutch mechanism having an axially shiftable rotatably journalled shaft in axial alinement with said motor shaft, said clutch mechanism including a clutch disc having oppositely facing friction rings, and a relatively fixed support for said clutch mechanism, said flywheel and said support being respectively provided with annular ribs respectively coaxial with respect to said axially alined shafts, said friction rings being respectively selectively engageable with said ribs to alternatively impart rotation of said motor shaft to said clutch mechanism shaft and interrupt rotation of said latter shaft while maintaining rotation of said motor shaft, a housing for said motor, flywheel and clutch mechanism, and means operative externally of the housing for axially shifting said motor and flywheel within said housing and relatively to said clutch mechanism whereby to vary the permissible stroke of said clutch mechanism.

5. In an electric power transmission apparatus, an electric motor and flywheel assembly, a cylindric housing for said assembly including means for clamping the housing about said motor to secure the latter within said housing, said housing being axially extended beyond said flywheel, a member secured to provide a support for a clutch mechanism, a clutch mechanism journalled within said support and including a rotatable shaft in axial alinement with the axis of rotation of said motor and flywheel assembly, said rotatable shaft being axially shiftable relatively to said assembly and having keyed thereto a clutch disc disposed intermediate said flywheel and said support for the clutch mechanism, and annular clutch elements respectively formed on said flywheel and support adapted to be selectively engaged by opposite faces of said clutch disc accordingly as said clutch mechanism is axially shifted in one direction or the other, and means for effecting positional adjustment of said assembly axially of said housing, said means comprising a pair of coaxially related elements one of which is fixed relative to, and axially extended beyond, said motor for threaded engagement with the other, the latter being revolubly carried by said support member and accessible externally of said housing whereby upon rotation thereof axial movement of said motor relative to said housing is effected through said one fixed element.

6. In an electric power transmission apparatus, an electric motor having a rotating shaft and a fly-wheel keyed to said shaft, said fly-wheel being provided in the outer face thereof with an axially extending annular clutch element, a relatively stationary member spaced axially from said fly-wheel and provided with an annular clutch element facing axially toward said first-mentioned clutch element, a clutch mechanism including a shaft in axial alinement with said motor shaft and an associated clutch disc having oppositely facing friction rings respectively engageable with said axially spaced annular clutch elements, said clutch mechanism being journalled in said stationary member for rotation and axial shifting of said shaft and associated clutch disc, and means for securing said motor and said stationary member in fixed axially spaced relation comprising a cylindrical housing adapted to be clamped about said motor, said stationary member being in the form of an end plate secured to one end of said housing.

7. An assembly comprising a housing open at one end, an electric motor disposed within said housing, a combined clutch and brake unit disposed within said housing, said motor having a casing comprising a pair of sections rigidly secured together by means including an axially extending threaded element and having a rotating shaft and a clutch element keyed to said shaft, the other end of said housing having an end plate carrying a fixed brake element, said combined unit being movable between clutch engaging and brake engaging position, and means for adjusting said motor axially within said housing to vary the extent of movement of said combined unit, said means comprising a second element revolubly carried by said end plate and threadedly engaged with one end portion of said first mentioned element axially extended beyond said motor, whereby upon rotation of said second element axial movement of said motor relative to said housing is effected through said first mentioned element.

8. An assembly comprising a housing open at one end, an electric motor disposed within said housing, a combined clutch and brake unit disposed within said housing, said motor having a casing comprising a section interposed between end bell sections, all three sections being rigidly secured together by means including an axially extending bolt member, a rotating shaft and a clutch element keyed to said shaft, the other end of said housing having an end plate carrying a fixed brake element, said combined unit being movable between clutch engaging and brake engaging position, and means for adjusting said motor axially within said housing to vary the extent of movement of said combined unit, said means comprising an element revolubly carried by said end plate through the medium of a constricted portion intermediate the ends thereof and threadedly engaged with one end portion of said bolt member axially extended beyond said motor, whereby upon rotation of said element movement of said motor relative to said housing is effected through said bolt member.

9. An assembly comprising a housing open at one end, an electric motor disposed within said housing, a combined clutch and brake unit disposed within said housing, said motor having a casing comprising a pair of sections rigidly secured together by means including an axially extending element and having a rotating shaft and a clutch element keyed to said shaft, the other end of said housing having an end plate carrying a fixed brake element, said combined unit being movable between clutch engaging and brake engaging position, and means for adjusting said motor axially within said housing to vary the extent of movement of said combined unit, said means comprising a second element revolubly carried by said end plate and engaged with said first mentioned element whereby upon rotation of said second element axial movement of said motor relative to said housing is effected through said first mentioned element.

References Cited in the file of this patent

UNITED STATES PATENTS

| Number | Name | Date |
|---|---|---|
| 868,580 | Pomeroy | Oct. 15, 1907 |
| 1,198,333 | Cummings | Sept. 12, 1916 |
| 1,325,005 | Dean | Dec. 16, 1919 |
| 1,370,895 | Loomis | Mar. 8, 1921 |
| 1,394,564 | Lindgren | Oct. 25, 1921 |
| 1,514,894 | Carter | Nov. 11, 1924 |
| 1,560,123 | Voigt | Nov. 3, 1925 |
| 1,723,468 | Colt | Aug. 6, 1929 |
| 1,756,576 | Voigt | Apr. 29, 1930 |
| 1,874,232 | Groene et al. | Aug. 30, 1932 |
| 1,962,880 | Schwab et al. | June 12, 1934 |
| 2,057,637 | Schneider | Oct. 13, 1936 |
| 2,068,331 | Katzman | Jan. 19, 1937 |
| 2,149,873 | Shapiro et al. | Mar. 7, 1939 |
| 2,174,297 | Way | Sept. 26, 1939 |
| 2,179,360 | Vasta | Nov. 7, 1939 |
| 2,208,513 | Katzman | July 16, 1940 |
| 2,263,156 | Abel | Nov. 18, 1941 |
| 2,320,113 | Wilhide | May 25, 1943 |
| 2,467,770 | Mulheim | Apr. 19, 1949 |
| 2,536,860 | Voigt | Jan. 2, 1951 |

FOREIGN PATENTS

| Number | Country | Date |
|---|---|---|
| 575,556 | France | Apr. 24, 1924 |